(12) United States Patent
Robertson et al.

(10) Patent No.: US 7,584,221 B2
(45) Date of Patent: Sep. 1, 2009

(54) FIELD WEIGHTING IN TEXT SEARCHING

(75) Inventors: Stephen Robertson, London (GB);
Hugo Zaragoza, Cambridge (GB);
Michael Taylor, Cambridge (GB);
Stefan Isbein Larimore, Redmond, WA (US); Mihai Petriuc, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 10/804,326

(22) Filed: Mar. 18, 2004

(65) Prior Publication Data

US 2005/0210006 A1    Sep. 22, 2005

(51) Int. Cl.
*G06F 12/00* (2006.01)
*G06F 17/30* (2006.01)

(52) U.S. Cl. .................. 707/201; 715/530; 715/522; 704/9

(58) Field of Classification Search ............ 704/9; 709/224; 707/102, 5, 3, 201, 203, 204, 10
See application file for complete search history.

(56) References Cited

U.S. PATENT DOCUMENTS

| | | | |
|---|---|---|---|
| 5,222,236 A * | 6/1993 | Potash et al. ............... 707/102 |
| 5,257,577 A | 11/1993 | Clark |
| 5,594,660 A | 1/1997 | Sung et al. |
| 5,606,609 A | 2/1997 | Houser et al. |
| 5,848,404 A | 12/1998 | Hafner et al. |
| 5,893,092 A | 4/1999 | Driscoll |
| 5,920,859 A | 7/1999 | Li ............................. 707/5 |
| 5,933,851 A | 8/1999 | Kojima et al. |
| 5,960,383 A * | 9/1999 | Fleischer .................... 704/9 |
| 5,983,216 A | 11/1999 | Kirsch et al. |
| 5,987,457 A | 11/1999 | Ballard |
| 6,006,225 A | 12/1999 | Bowman et al. |
| 6,012,053 A | 1/2000 | Pant et al. |
| 6,032,196 A | 2/2000 | Monier |
| 6,041,323 A | 3/2000 | Kubota |
| 6,070,158 A | 5/2000 | Kirsch et al. |
| 6,070,191 A | 5/2000 | Narendran et al. |
| 6,098,064 A | 8/2000 | Pirolli et al. |

(Continued)

FOREIGN PATENT DOCUMENTS

DE    10029644 A1    1/2002

(Continued)

OTHER PUBLICATIONS

Non-Patent Literature: "The Anatomy of a Large-Scale Hypertextual Web Search Engine", Sergey Bring and Lawrence Page, Standford University, Standford, CA, Apr. 14, 1998.*

(Continued)

*Primary Examiner*—Jean M Corrielus
*Assistant Examiner*—Giovanna Colan
(74) *Attorney, Agent, or Firm*—Merchant & Gould; Ryan T. Grace

(57) ABSTRACT

A field-weighted search combines statistical information for each term across document fields in a suitably weighted fashion. Both field-specific term frequencies and field and document lengths are considered to obtain a field-weighted document weight for each query term. Each field-weighted document weight can then be combined in order to generate a field-weighted document score that is responsive to the overall query.

21 Claims, 7 Drawing Sheets

U.S. PATENT DOCUMENTS

| | | | |
|---|---|---|---|
| 6,125,361 A | 9/2000 | Chakrabarti et al. | |
| 6,128,701 A | 10/2000 | Malcolm et al. | |
| 6,145,003 A | 11/2000 | Sanu et al. | |
| 6,151,624 A | 11/2000 | Teare et al. | 709/217 |
| 6,167,369 A | 12/2000 | Schulze | |
| 6,182,085 B1 | 1/2001 | Eichstaedt et al. | |
| 6,182,113 B1 | 1/2001 | Narayanaswami | 709/203 |
| 6,185,558 B1 | 2/2001 | Bowman et al. | |
| 6,202,058 B1 | 3/2001 | Rose et al. | |
| 6,208,988 B1 | 3/2001 | Schultz | |
| 6,222,559 B1 | 4/2001 | Asano et al. | 345/440 |
| 6,240,407 B1 | 5/2001 | Chang et al. | |
| 6,240,408 B1 | 5/2001 | Kaufman | |
| 6,247,013 B1 | 6/2001 | Morimoto | 707/10 |
| 6,263,364 B1 | 7/2001 | Najork et al. | |
| 6,285,367 B1 | 9/2001 | Abrams et al. | 345/357 |
| 6,285,999 B1 | 9/2001 | Page | |
| 6,304,864 B1 | 10/2001 | Liddy et al. | |
| 6,317,741 B1 | 11/2001 | Burrows | |
| 6,327,590 B1 | 12/2001 | Chidlovskii | |
| 6,349,308 B1 | 2/2002 | Whang et al. | 707/107 |
| 6,351,467 B1 | 2/2002 | Dillon | |
| 6,351,755 B1 | 2/2002 | Najork et al. | |
| 6,360,215 B1 | 3/2002 | Judd et al. | |
| 6,385,602 B1 | 5/2002 | Tso et al. | |
| 6,389,436 B1 | 5/2002 | Chakrabarti et al. | |
| 6,418,433 B1 | 7/2002 | Chakrabarti et al. | |
| 6,418,452 B1 | 7/2002 | Kraft et al. | |
| 6,418,453 B1 | 7/2002 | Kraft et al. | |
| 6,442,606 B1* | 8/2002 | Subbaroyan et al. | 709/224 |
| 6,484,204 B1 | 11/2002 | Rabinovich | |
| 6,516,312 B1 | 2/2003 | Kraft et al. | 707/3 |
| 6,539,376 B1 | 3/2003 | Sundaresan et al. | |
| 6,546,388 B1 | 4/2003 | Edlund | |
| 6,547,829 B1 | 4/2003 | Meyerzon et al. | |
| 6,549,897 B1 | 4/2003 | Katariya et al. | |
| 6,594,682 B2 | 7/2003 | Peterson et al. | |
| 6,598,047 B1 | 7/2003 | Russell et al. | |
| 6,598,051 B1 | 7/2003 | Wiener et al. | |
| 6,601,075 B1 | 7/2003 | Huang et al. | 707/104.1 |
| 6,622,140 B1 | 9/2003 | Kantrowitz | |
| 6,628,304 B2 | 9/2003 | Mitchell et al. | 345/734 |
| 6,633,867 B1 | 10/2003 | Kraft et al. | 707/3 |
| 6,633,868 B1 | 10/2003 | Min | |
| 6,638,314 B1 | 10/2003 | Meyerzon et al. | |
| 6,671,683 B2 | 12/2003 | Kanno | |
| 6,701,318 B2 | 3/2004 | Fox et al. | |
| 6,718,324 B2 | 4/2004 | Edlund et al. | |
| 6,718,365 B1 | 4/2004 | Dutta | |
| 6,738,764 B2 | 5/2004 | Mao et al. | |
| 6,763,362 B2 | 7/2004 | McKeeth | 707/104.1 |
| 6,766,316 B2* | 7/2004 | Caudill et al. | 707/3 |
| 6,766,422 B2 | 7/2004 | Beyda | |
| 6,775,659 B2 | 8/2004 | Clifton-Bligh | 707/1 |
| 6,775,664 B2 | 8/2004 | Lang et al. | |
| 6,778,997 B2 | 8/2004 | Sundaresan et al. | |
| 6,829,606 B2* | 12/2004 | Ripley | 707/5 |
| 6,862,710 B1 | 3/2005 | Marchisio | 715/501.1 |
| 6,871,202 B2 | 3/2005 | Broder | |
| 6,883,135 B1 | 4/2005 | Obata et al. | |
| 6,886,010 B2 | 4/2005 | Kostoff | |
| 6,886,129 B1 | 4/2005 | Raghavan et al. | 715/501.1 |
| 6,910,029 B1 | 6/2005 | Sundaresan | |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | |
| 6,947,930 B2 | 9/2005 | Anick et al. | 707/5 |
| 6,959,326 B1 | 10/2005 | Day et al. | 709/217 |
| 6,973,490 B1 | 12/2005 | Robertson et al. | |
| 6,990,628 B1 | 1/2006 | Palmer et al. | |
| 7,016,540 B1 | 3/2006 | Gong et al. | |
| 7,028,029 B2 | 4/2006 | Kamvar et al. | |
| 7,051,023 B2 | 5/2006 | Kapur et al. | |
| 7,072,888 B1 | 7/2006 | Perkins | |
| 7,076,483 B2 | 7/2006 | Preda et al. | |
| 7,080,073 B1 | 7/2006 | Jiang et al. | |
| 7,107,218 B1 | 9/2006 | Preston | |
| 7,152,059 B2 | 12/2006 | Monteverde | |
| 7,181,438 B1 | 2/2007 | Szabo | |
| 7,197,497 B2 | 3/2007 | Cossock | |
| 7,243,102 B1 | 7/2007 | Naam et al. | |
| 7,246,128 B2 | 7/2007 | Jordahl | |
| 7,257,577 B2 | 8/2007 | Fagin et al. | |
| 7,281,002 B2 | 10/2007 | Farrell | |
| 7,328,401 B2 | 2/2008 | Obata et al. | |
| 7,428,530 B2 | 9/2008 | Ramaranthnam et al. | |
| 2001/0042076 A1 | 11/2001 | Fukuda | 707/500 |
| 2002/0055940 A1 | 5/2002 | Elkan | |
| 2002/0062323 A1 | 5/2002 | Takatori et al. | |
| 2002/0078045 A1 | 6/2002 | Dutta | |
| 2002/0099694 A1 | 7/2002 | Diamond et al. | |
| 2002/0103798 A1 | 8/2002 | Abrol et al. | |
| 2002/0107861 A1 | 8/2002 | Clendinning et al. | 77/101 |
| 2002/0107886 A1 | 8/2002 | Gentner et al. | |
| 2002/0129014 A1 | 9/2002 | Kim et al. | |
| 2002/0169595 A1* | 11/2002 | Agichtein et al. | 704/9 |
| 2002/0169770 A1 | 11/2002 | Kim et al. | 707/5 |
| 2003/0037074 A1 | 2/2003 | Dwork et al. | |
| 2003/0061201 A1 | 3/2003 | Grefenstette et al. | |
| 2003/0065706 A1 | 4/2003 | Smyth et al. | |
| 2003/0074368 A1 | 4/2003 | Schuetze et al. | |
| 2003/0208482 A1 | 11/2003 | Kim et al. | |
| 2003/0217047 A1 | 11/2003 | Marchisio | |
| 2003/0217052 A1 | 11/2003 | Rubenczyk et al. | |
| 2004/0006559 A1 | 1/2004 | Gange et al. | |
| 2004/0049766 A1 | 3/2004 | Bloch et al. | 717/121 |
| 2004/0093328 A1 | 5/2004 | Damle | |
| 2004/0117351 A1 | 6/2004 | Challapalli et al. | 707/2 |
| 2004/0148278 A1 | 7/2004 | Milo et al. | |
| 2004/0181515 A1 | 9/2004 | Ullmann et al. | |
| 2004/0186827 A1 | 9/2004 | Anick et al. | 707/3 |
| 2004/0194099 A1 | 9/2004 | Lamping et al. | |
| 2004/0199497 A1 | 10/2004 | Timmons | |
| 2004/0215606 A1 | 10/2004 | Cossock | |
| 2004/0215664 A1 | 10/2004 | Hennings et al. | 707/104.1 |
| 2004/0254932 A1 | 12/2004 | Gupta et al. | |
| 2005/0033742 A1 | 2/2005 | Kamvar et al. | |
| 2005/0044071 A1 | 2/2005 | Cho et al. | |
| 2005/0055340 A1 | 3/2005 | Dresden | |
| 2005/0055347 A9 | 3/2005 | Cho et al. | |
| 2005/0060311 A1 | 3/2005 | Tong et al. | |
| 2005/0071328 A1 | 3/2005 | Lawrence | |
| 2005/0071741 A1 | 3/2005 | Acharya et al. | |
| 2005/0086192 A1 | 4/2005 | Kodama | |
| 2005/0086206 A1 | 4/2005 | Balasubramanian et al. | |
| 2005/0086583 A1 | 4/2005 | Obata et al. | |
| 2005/0144162 A1 | 6/2005 | Liang | |
| 2005/0154746 A1 | 7/2005 | Liu et al. | |
| 2005/0165781 A1 | 7/2005 | Kraft et al. | |
| 2005/0187965 A1 | 8/2005 | Abajian | |
| 2005/0192936 A1 | 9/2005 | Meek et al. | |
| 2005/0192955 A1 | 9/2005 | Farrell | |
| 2005/0210006 A1 | 9/2005 | Robertson | |
| 2005/0216533 A1 | 9/2005 | Berkhin | |
| 2005/0240580 A1 | 10/2005 | Zamir et al. | |
| 2005/0251499 A1 | 11/2005 | Huang | |
| 2005/0262050 A1 | 11/2005 | Fagin et al. | |
| 2006/0047649 A1 | 3/2006 | Liang | |
| 2006/0173560 A1 | 8/2006 | Widrow | |
| 2006/0195440 A1 | 8/2006 | Burges et al. | |
| 2006/0206460 A1 | 9/2006 | Gadkari et al. | |
| 2006/0206476 A1 | 9/2006 | Kapur et al. | |
| 2006/0282455 A1 | 12/2006 | Lee et al. | |
| 2006/0287993 A1 | 12/2006 | Yao et al. | |

| | | | |
|---|---|---|---|
| 2007/0038616 | A1 | 2/2007 | Guha |
| 2007/0038622 | A1 | 2/2007 | Meyerzon et al. |
| 2007/0073748 | A1 | 3/2007 | Barney |
| 2007/0106659 | A1 | 5/2007 | Lu et al. |
| 2007/0150473 | A1 | 6/2007 | Li et al. |

FOREIGN PATENT DOCUMENTS

| | | |
|---|---|---|
| EP | 0 950 961 A2 | 10/1999 |
| EP | 1 050 830 A2 | 11/2000 |
| EP | 1 120 717 A2 | 8/2001 |
| EP | 1282060 A2 | 2/2002 |
| EP | 1557770 A1 | 7/2005 |
| JP | 10-91638 | 4/1998 |
| JP | 11-328191 | 11/1999 |
| KR | 10-2002-0015838 A | 3/2002 |
| KR | 10-2003-0082109 A | 10/2003 |
| KR | 10-2006-0116042 A | 11/2006 |

OTHER PUBLICATIONS

Chakrabarti, S., "Recent Results in Automatic Web Resource Discovery", ACM Computing Surveys, vol. 31, No. 4, Dec. 1999, pp. 1-7.
Cho et al., "Efficient Crawling Through URL Ordering", In Proceedings of the 7th International World Wide Web Conference, Apr. 1998, pp. 161-180.
Huang et al., "Design and Implementation of a Chinese Full-Text Retrieval System Based on Probabilistic Model", IEEE, 1993, pp. 1090-1093.
Lam et al., "Automatic Document Classification Based on Probabilistic Reasoning: Model and Performance Analysis", IEEE, 1997, pp. 2719-2723.
Lee, J.K.W. et al., "Intelligent Agents for Matching Information Providers and Consumers on the Worl-Wide Web", IEEE, 1997, pp. 189-199.
Najork, Marc et al., "Breadth-First Crawling Yields High-Quality Pages", ACM, Compaq Systems Research Center, Hong Kong, 2001, pp. 114-118.
Yuwono, Budi and Lee, Dik L., "Search and Ranking Algorithms for Locating Resources on the World Wide Web", IEEE, 1996, pp. 164-170.
U.S. Official Action in U.S. Appl. No. 10/955,462 mailed Nov. 3, 2006.
U.S. Official Action in U.S. Appl. No. 10/955,462 mailed May 11, 2007.
U.S. Official Action in U.S. Appl. No. 10/955,462 mailed Sep. 10, 2007.
U.S. Official Action in U.S. Appl. No. 10/955,983 mailed Mar. 22, 2007.
U.S. Official Action in U.S. Appl. No. 10/955,983 mailed Nov. 13, 2007.
U.S. Official Action in U.S. Appl. No. 10/981,962 mailed Apr. 5, 2006.
U.S. Official Action in U.S. Appl. No. 10/981,962 mailed Sep. 21, 2006.
U.S. Official Action in U.S. Appl. No. 10/981,962 mailed Apr. 30, 2007.
U.S. Official Action in U.S. Appl. No. 10/981,962 mailed Mar. 17, 2008.
U.S. Official Action in U.S. Appl. No. 11/019,091 mailed Jun. 20, 2007.
U.S. Official Action in U.S. Appl. No. 11/019,091 mailed Apr. 3, 2008.
U.S. Official Action in U.S. 11/238,906 mailed Jan. 8, 2008.
U.S. Official Action in U.S. Appl. No. 11/412,723 mailed May 28, 2008.
EP Exam Report in EP 00309121.2-1522 mailed Jul. 4, 2003.
EP Exam Report in EP 00309121.2-1527 mailed Jun. 16, 2004.
EP Exam Report in EP 00309121.2-1527 mailed Feb. 8, 2007.
EP Search Report in EP 00309121 mailed Jul. 18, 2002.
EP Search Report in EP 05105048 mailed Jan. 17, 2006.
EP Search Report in EP 05105110 dated Aug. 11, 2006.
U.S. Appl. No. 09/493,748, filed Jan. 28, 2000, Obata et al.
Chen, Michael et al., Cha Cha, "A System for Organizing Intranet Search Results", Computer Science Department, University of California, Berkeley, 1999, pp. 1-12.
U.S. Official Action in U.S. Appl. No. 10/955,983 mailed Jul. 21, 2008.
U.S. Official Action in U.S. Appl. No. 11/019,091 mailed Dec. 11, 2008.
U.S. Official Action in U.S. Appl. No. 10/955,983 mailed Dec. 18, 2008.
U.S. Official Action in U.S. Appl. No. 11/206,286 mailed Dec. 24, 2008.
Chinese Second Official Action in 200510088527.5 mailed Dec. 26, 2008.
Voorhees, Ellen M.; "Overview of TREC 2002" Gaithersburg, Maryland, Nov. 19-22, 2002, 15 pages.
Craswell, Nick; Hawking, David; Upstill, Trystan; "TREC12 Web Track as CSIRO" TREC 12, Nov. 2003; 11 pages.
Kotsakis, Evangelos; "Structured Information Retrieval in XML Documents" Proceedings of the ACM symposium on Applied computing Madrid, Spain, 2002 pp. 663-667.
Ogilvie, Paul; Callan, Jamie; "Combining Document Representations for Known-Item Search" Proceedings of the 26th annual international ACM SIGIR conference on Research and development in informaion retrieval Toronto, Canada 2003, pp. 143-150.
Carmel, David; Maarek, Yoelle S.; Mandelbrod, Matan; Mass, Yosi; Soffer, Aya; "Searching XML Documents via XML Fragments" SIGIR Toronto, Canada, Jul.-Aug. 2003, p. 151-158.
Robertson, S.E., Walker, S., Beaulieu, M.M., Gatford, M., Payne A.; "Okapi at TREC-4" 1996, 24 pages.
Web Page "Reuters; Reuters Corpus" http://about.reuters.com/researchandstandards/corpus/; viewed Mar. 18, 2004.
Lalmas, Mounia; "Uniform Representation of Content and Structure for Structured Document Retrieval" 20th SGES International Conference on Knowledge Based Systems and Applied Artificial Intelligence, Cambridge, UK, Dec. 2000. pp. 1-12.
Robertson, S.E., Walker, S.; "Some Simple Effective Approximations to the 2-Poisson Model for Probabilistic Weighted Retrieval" In Proceedings of the 17 th Annual International ACM SIGIR Conference on Research and Development in Information Retrieval, 1994. pp. 232-241.
Wilkinson, Ross; "Effective Retrieval of Structured Documents" Annual ACM Conference on Research and Development 1994, 7 pgs.
Hawking, David; "Overview of the TREC-9 Track" TREC 2000, pp. 1-16.
Hawking, David; Craswell, Nick; Thistlewaite; "Overview of TREC-7 Very Large Collection Track" TREC Jan. 1999, 1-13.
Hawking, David; Voorhees, Ellen; Craswell, Nick; Bailey, Peter; "Overview of the TREC-8 Web Track" TREC Feb. 2000, pp. 1-18.
U.S. Official Action in U.S. Appl. No. 11/412,723 mailed Mar. 6, 2009.
PCT Search Report in PCT/US2008/011894 mailed Feb. 27, 2009.
Chinese Decision on Rejection in 200510088213.5 mailed Mar. 6, 2009.
U.S. Official Action in U.S. Appl. No. 11/073,381 mailed Apr. 15, 2009.
U.S. Official Action in U.S. Appl. No. 11/238,906 mailed Sep. 16, 2008.
Brin, S. et al.; "The Anatomy of a Large-Scale Hypertexual Web Search Engine", In Proceedings of the 7th International World Wide Web Conference, Brisbane, Australia, pp. 107-117, 1998.
Fargin et al.; "Searching the Workplace Web" May 24, 2003 WWW2003, [online] XP002392503; Retrieved from the internet: URL: http://www.almaden.ibm.com/cs/people/fagin/www03.pdf, 10 pages.
U.S. Appl. No. 11/874,579, filed Oct. 18, 2007, Dmitriy Meyerzon.
U.S. Appl. No. 11/874,844, filed Oct. 18, 2007, Dmitriy Meyerzon.
U.S. Appl. No. 12/207,910, filed Sep. 10, 2008, Valdimir Tankovich.
Smyth, Barry, "Relevance at a Distance—An Investigation of Distance-Biased Personalization on the Mobile Internet", no date, pp. 1-6.
Senecal, Sylvain, "Consumers' Decision-Making Process and Their Online Shopping Behavior: A Clickstream Analysis", Jun. 1, 2004, pp. 1600-1607.

Fagin, Ronald, "Searching the Workplace Web", Mar. 3, 2005, pp. 1-10.
Wen, Ji-Rong, "Query Clustering Using User Logs", Jan. 2002, pp. 59-81.
Agichten et al., "Improving Web Search Ranking by Incorporating User Behavior Information"—http://www.mathcs.emory.edu/~eugene/papers/sigir2006ranking.pdf, 8 pp.
Taylor et al., "Optimisation Methods for Ranking Functions with Multiple Parameters"— http://delivery.acm.org/10.1145/1190000/1183698/p585-taylor.pdf?key1=1183698&key2=3677533811&coll=GUIDE&dl=GUIDE&CFID=22810237&CFTOKEN=34449120, pp. 585-593.
Burges, Christopher J.C. et al. "Learning to Rank with Nonsmooth Cost Functions"—http://books.nips.cc/papers/txt/nips19/NIPS2006_0574.txt, 2 pp.
Filip Radlinski, et al.,, "Query Chains: Learning to Rank from Implicit Feedback", http://delivery.acm.org/10.1145/1090000/1081899/p239-radlinski.pdf?key1=1081899&key2=3628533811&coll=GUIDE& CFID=27212902&CFTOKEN=53118399, KDD'05, Chicago, IL, Aug. 21-24, 2005,10 pages.
Irina Matveeva, et al., "High Accuracy Retrieval with Multiple Nested Ranker," http://people.cs.uchicago.edu/~matveeva/RankerSIGIR06.pdf, SIGIR'06, Seattle, WA Aug. 6-11, 2006, 8 pages.
Gui-Rong Xue, et al., "Optimizing Web Search Using Web Click-Through Data," http://people.cs.vt.edu/~xwensi/Publication/p118-xue.pdf, CIKM'04, Nov. 8-13, 2004, 9 pages.
Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.
Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.
Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.
MSDN, "Understanding Ranking," http://msdn.microsoft.com/en-us/library/ms142524.aspx, Sep. 2007, 4 pages.
Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.
U.S. Official Action in U.S. Appl. No. 11/073,381 mailed Jul. 10, 2008.
U.S. Official Action in U.S. Appl. No. 11/206,286 mailed Jul. 14, 2008.
U.S. Official Action in U.S. Appl. No. 11/238,906 mailed Sep. 16, 2008.
PCT Search Report in PCT/US2006/031965 mailed Jan. 11, 2007.
EP Exam Report in EP 05105048.2-2201 mailed Apr. 23, 2007.
Chinese First Official Action in 200510088527.5 mailed Apr. 18, 2008.
Chinese First Official Action in 200510088213.5 mailed May 9, 2008.
Chinese Second Official Action in 200510088213.5 mailed Oct. 10, 2008.
Brin, S. et al., "The Anatomy of a Large-Scale Hypertextual Web Search Engine", Proceedings of the Seventh International World-Wide Web Conference, 'Online! Apr. 14, 1998, pp. 1-26.
Cutler, M. et al., "A New Study on Using HTML Structures to Improve Retrieval", 11th IEEE International Conference on Chicago, IL, Nov. 9-11, 1999, pp. 406-409.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, 2003, 21 pgs.

Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Jones, K. et al., "A probabilistic model of information retrieval: development and status", Department of Information Science, City University, London, Aug. 1998, 74 pgs.
Kucuk, Mehmet Emin, et al., "Application of Metadata Concepts to Discovery of Internet Resources", ADVIS 2000, INCS 1909, pp. 304-313, 2000.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Losee, R. et al., "Research in Information Organization", Literature Review, School of Information and Library Science, Section 4, pp. 53-96, Jan. 2001.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Nelson, Chris, "Use of Metadata Registries for Searching for Statistical Data", IEEE 2002, Dimension EDI Ltd., pp. 232-235, 2002.
Numerico, T., "Search engines organization of information and Web Topology", http://www.cafm.lsbu.ac.uk/eminars/sse/numerico-6-dec-2004.pdf, Dec. 6, 2004, 32 pgs.
Schulz, Stefan, et al., "Indexing Medical WWW Documents by Morphemes", Medinfo 2001 Proceedings of the $10^{th}$ World Congress on Medical Informatics, Park I, IOS Press, Inc., pp. 266-270, 2001.
Singhal, A. et al., "AT&T at TREC-9", Proceedings of the Ninth Text Retrieval Conference, NIST Special Publication 500-249, 'Online! 2001, pp. 103-105.
Sturdy, Derek, "Squirrels and nuts: metadata and knowledge management", Business Information Review, 18(4), pp. 34-42, Dec. 2001.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.
Zamir, O. et al., "Grouper: A Dynamic Clustering Interface to Web Search Results", Computer Networks (Amsterdam, Netherlands: 1999), 31(11-16): 1361-1374, 1999.
"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.
"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.
"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.
"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.
Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.
"SharePoint Portal Server 2001 Planning and Installation Guide", http://www.microsoft.com/technet/prodtechnol/sppt/sharepoint/plan/planinst.mspx, printed on May 22, 2006, 86 pp.
U.S. Appl. No. 11/019,091, filed Dec. 21, 2004 entitled "Ranking Search Results Using Feature Extraction".

U.S. Appl. No. 11/073,381, filed Mar. 3, 2005 entitled "System and Method for Ranking Search Results Using File Types".
U.S. Appl. No. 10/609,315, filed Jun. 27, 2003, entitled "Normalizing Document Metadata Using Directory Services".
U.S. Appl. No. 11/238,906, filed Sep. 29, 2005 entitled "Click Distance Determination".
U.S. Appl. No. 11/412,723, filed Apr. 26, 2006, entitled "Ranking Search Results Using Language Types".
U.S. Appl. No. 10/955,462, filed Sep. 30, 2004 entitled "System and Method for Incorporating Anchor Text Into Ranking Search Results".
U.S. Appl. No. 10/955,983, filed Sep. 30, 2004 entitled "System and Method for Ranking Search Results Using Click Distance".
Official Action in U.S. Appl. No. 10/609,315 mailed Dec. 15, 2005.
Official Action in U.S. Appl. No. 10/609,315 mailed Jun. 1, 2006.

* cited by examiner

FIELD WEIGHTING IN TEXT SEARCHING

TECHNICAL FIELD

The invention relates generally to text document searching, and more particularly to field weighting in text document searching.

BACKGROUND

In a text document search, a user typically enters a query into a search engine. The search engine evaluates the query against a database of indexed documents and returns a ranked list of documents that best satisfy the query. A score, representing a measure of how well the document satisfies the query, is algorithmically generated by the search engine. Commonly-used scoring algorithms rely on splitting the query up into search terms and using statistical information about the occurrence of individual terms in the body of text documents to be searched. The documents are listed in rank order according to their corresponding scores so the user can see the best matching search results at the top of the search results list.

Many such scoring algorithms assume that each document is a single, undifferentiated string of text. The query of search terms is applied to the text string (or more accurately, to the statistics generated from the undifferentiated text string that represents each document). However, documents often have some internal structure (e.g., fields containing titles, section headings, metadata fields, etc.), and reducing such documents to an undifferentiated text string loses any searching benefit provided by such structural information.

Some existing approaches attempt to incorporate the internal structure of documents into a search by generating statistics for individual document fields and generating scores for individual fields. The score for an individual document is then computed as a weighted sum of scores for its fields. However, in such existing approaches, the weights applied to individual fields of different documents do not adequately consider the influence of document length, field lengths, and the possible combinations of term frequencies of different query terms in different fields on the overall score for a given document.

SUMMARY

Implementations described and claimed herein address the foregoing problems by combining statistical information for each term across document fields in a suitably weighted fashion. Both field-specific term frequencies and field lengths may be considered to obtain a field-weighted document weight for each query term. Each field-weighted document weight can then be combined in order to generate a field-weighted score that is responsive to the overall query.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing on a computer system a computer process for determining a field-weighted score for a document having multiple fields relative to a query having a plurality of query terms. A field-weighted term frequency is computed for each query term based on field weights designated for individual fields in the document. A field-weighted document weight is computed for each query term based on the field-weighted term frequency for each field in the document. The field-weight score is computed based on the field-weighted document weights of the query terms.

In another implementation, a method is provided that determines a field-weighted score for a document having multiple fields relative to a query having a plurality of query terms. A field-weighted term frequency is computed for each query term based on field weights designated for individual fields in the document. A field-weighted document weight is computed for each query term based on the field-weighted term frequency for each field in the document. The field-weight score is computed based on the field-weighted document weights of the query terms.

In another implementation, a system for determining a field-weighted score for a document having multiple fields relative to a query having a plurality of query terms is provided. A field-weighted term frequency calculator computes a field-weighted term frequency for each query term based on field weights designated for individual fields in the document. A field-weighted document weight calculator computes a field-weighted document weight for each query term based on the field-weighted term frequency for each field in the document. A search engine computes the field-weighted score as a function of the field-weighted document weights of the query terms.

Other implementations are also described and recited herein.

BRIEF DESCRIPTIONS OF THE DRAWINGS

DETAILED DESCRIPTION

Figure 1:
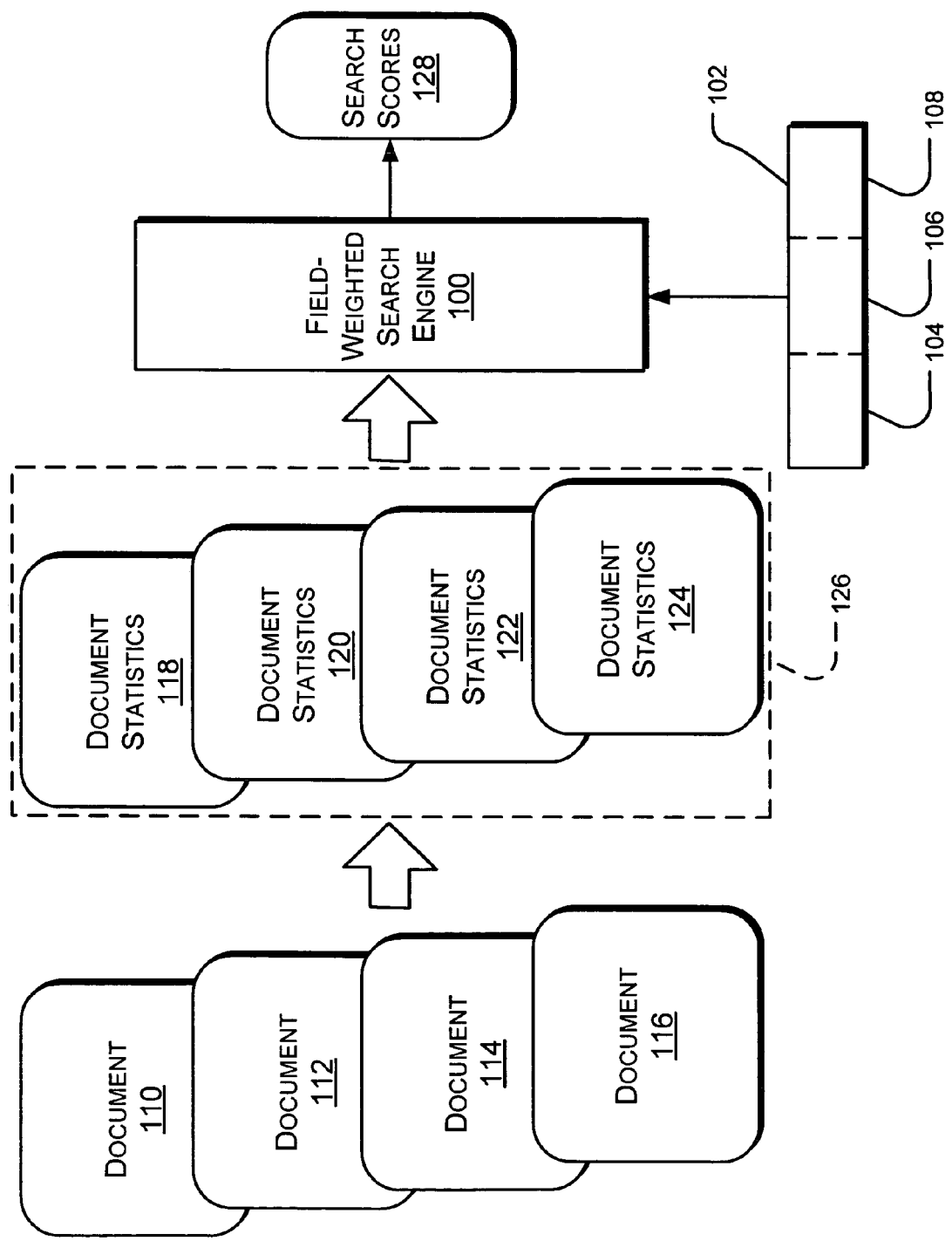
FIG. 1 illustrates an exemplary field-weighted search engine.

FIG. 1 illustrates an exemplary field-weighted search engine 100. The search engine 100 receives a query 102 containing multiple query terms 104, 106, and 108. Each query term may include multiple component terms, such as if the query term is a phrase (e.g., the phrase "document management system" may be considered a single query term"). In addition, a query may include one or more operators, such as Boolean operators, constraints, etc., which are commonly supported by known search engines.

A plurality of documents, represented by documents 110, 112, 114, and 116, are available for searching. In practice, a search engine may search any number of documents and typically search collections containing large numbers (e.g., millions) of documents. An indexing module (not shown)

generates individual document statistics (e.g., 118, 120, 122, and 124) for each document. The document statistics are stored in an index 126.

The search engine 100 interrogates the index 126 to determine a search score 128 for each document based on the query 102 and the corresponding document statistics. Typically, the document scores 128 are then ranked in descending order to give the user a list of documents that are considered by the search algorithm to be most relevant to the query 102.

In the illustrated system, the search engine 100 represents a field-weighted search engine, which considers the structure of a document in its search algorithm. For examples, a simple document structure may include fields, such as title, abstract, and body. Other exemplary types of fields may include without limitation headings, sections, conclusions, and metadata fields.

A field-weighted search may be expected to be more accurate when the different fields are expected to include the same general type of language, although a less constrained selection of fields may be effective as well. For example, fields such as title, abstract, and body might be expected to share common and important terms that are indicative of the relevance of the document to a given search. In contrast, an author field tends to include names (a different "type" of language) that are not expected to be contained within the title, abstract, and body. Accordingly, one implementation omits an author field from a field-weighted search for this reason. Author fields and other "different types" of fields are, nevertheless, eligible for consideration in a field-weighted search, in any combination.

Figure 3:
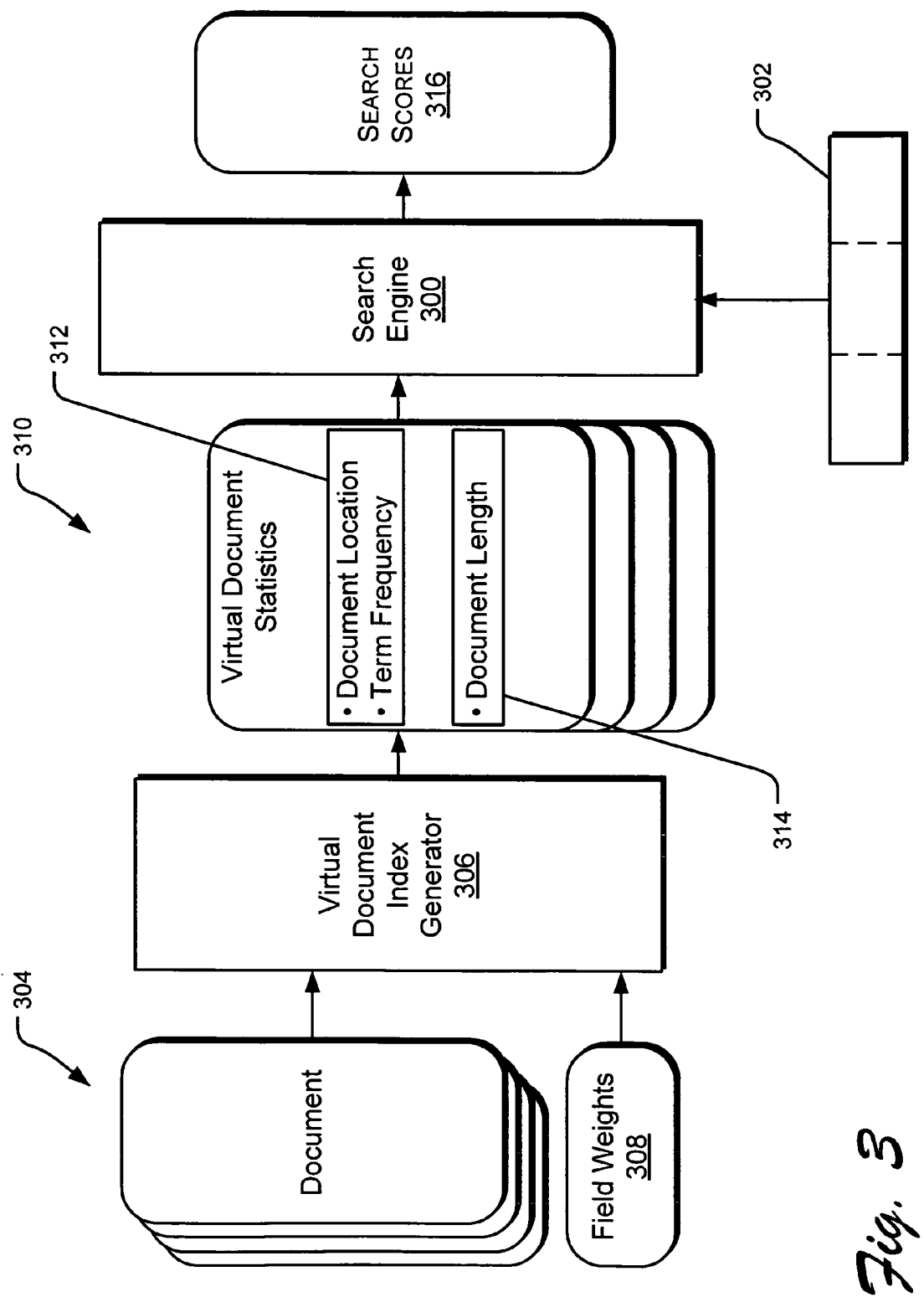
FIG. 3 illustrates an exemplary search engine employing a virtual document approach to provide a field-weighted search.

In one implementation, aspects of field weighting may be introduced by way of a field weighting indexer (e.g., the virtual document index generator of FIG. 3). In another implementation, fielding weighting features may be integrated into a field weighting search engine (e.g., the field weighting search engine of FIG. 4).

Figure 2:
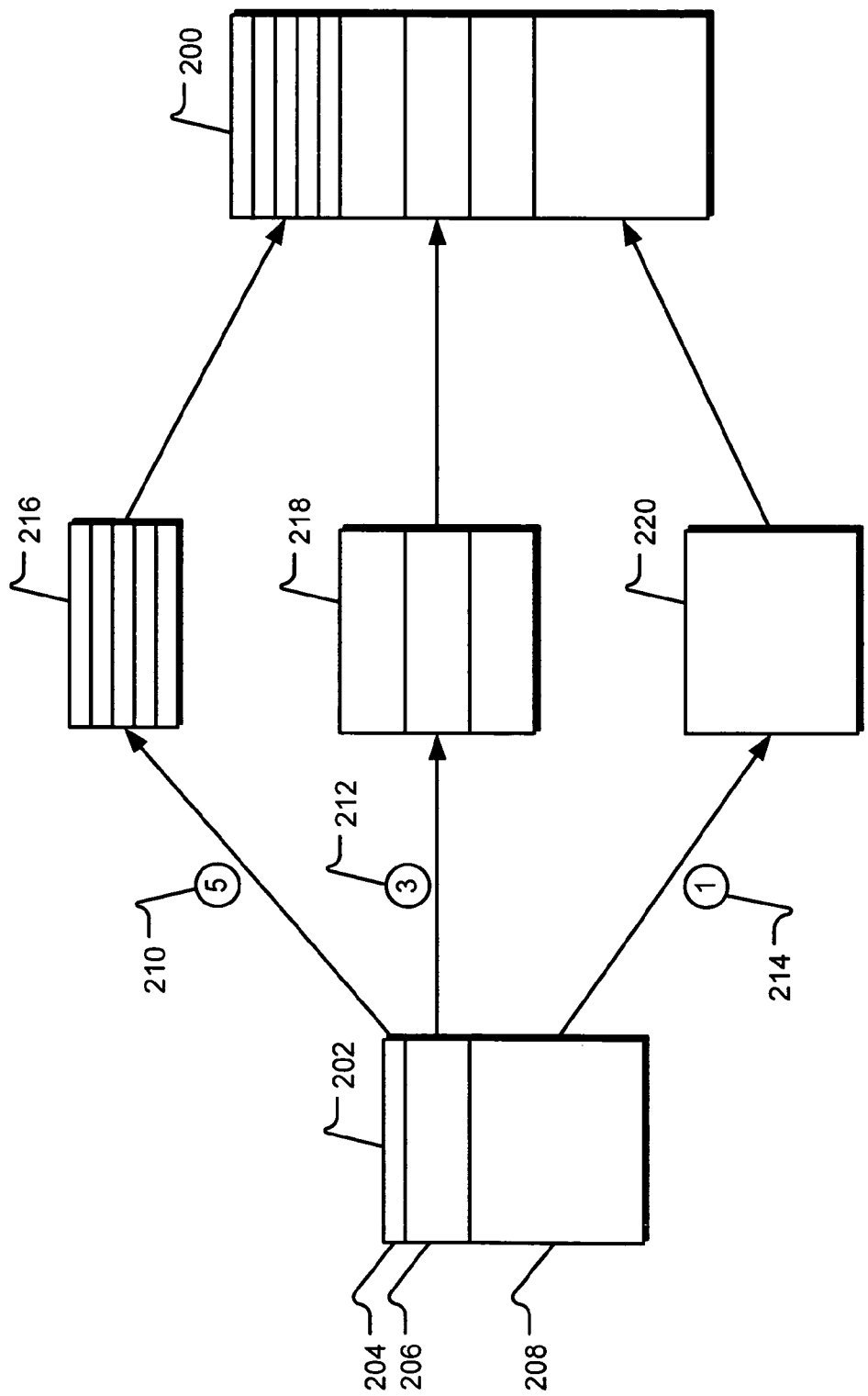
FIG. 2 illustrates an exemplary generation of a virtual document.

FIG. 2 illustrates an exemplary generation of a virtual document 200 from a document 202 that includes multiple fields: title field 204, abstract field 206, and body field 208. In this implementation, field weighting is introduced through the generation of a virtual documents 200 as influenced by field weight 210 (weight=5 in association with the title field 204), field weight 212 (weight=3 in association with the abstract field 206), and field weight 214 (weight=1 in association with the body field 208). A weight equaling zero may also be used, for example, to ignore the associated field in the search results.

In this implementation, each field of the document is replicated the number of times indicated by the field weight. The replicated field copies are concatenated to produce a field set (although other methods of combining the field copies into a field set may be employed). For example, the title 204 field is replicated five times to produce the title field set 216, the abstract field 206 is replicated three times to produce the abstract field set 218, and the body field 208 replicated once to product an abstract fields set 220.

The three field sets are then concatenated together into the virtual document 200 (although other combinations are possible, such as mixing the field sets). As described with regard to FIG. 3, the virtual document may then be indexed to provide field-weighted virtual document statistics for the document 202. These statistics may then be retrieved by a search engine to produce a field-weighted score for the document 202.

FIG. 3 illustrates an exemplary search engine 300 employing a virtual document approach to provide a field-weighted search. The search engine 300 receives a query 302 containing multiple query terms. A plurality 304 of documents is available for searching.

A virtual document index generator 306 inputs each document and a set of field weights 308. The index generator 306 generates a virtual document (not shown) from each input document, such as described with regard to FIG. 2. The index generator 306 then generates virtual document statistics 310 for each virtual document. The virtual document statistics 310 may include term statistics 312 (including without limitation the frequencies of each term in the document (i.e., "term frequency" in the document) and the locations of each term in the document) and a document length table 314 (which indicates the length of the document).

To describe the operations for an exemplary field-weighted search using the virtual document approach, the following terms and notations are introduced. (Certain terms are preceded by a parenthetical indicating that the terms are "field-weighted". This description is meant to indicate that the document statistics of the virtual document implicitly include the influence of field weighting because the virtual document was constructed based on the field weights and the field lengths.):

Base Query Term Weight ($w_i$)—a weight applied to the query term i (e.g., the definite article "the" may be given less weight than other more informative query terms "structured" or "document")

(Field-weighted) Term Frequency ($tf_{i,d}$)—the number of occurrences of term i in virtual document d (Field-weighted) Document Length ($dl_d$)—the length of virtual document d (Field-weighted) document Weight ($wd_i$)—a function of a base query weight w for each query term i, the Term Frequency ($tf_{i,d}$) in the virtual document d, the document length (did) of the virtual document d, and possibly other document-specific information ($dl_d$) (i.e., $wd_i(w_i, tf_{i,d}, dl_d, \theta_d)$); this function may be linear or non-linear Document Score ($sc_d$)—combines the document weights of all the terms of a query (indexed 1, . . . , V) into a single document score (e.g., $sc_d(wd_1, wd_2, \ldots, wd_v)$); may be a linear combination or a non-linear combination The search engine 300 then applies its search algorithm to generate a field-weighted document weight for each query term from the virtual document statistics. There exist a variety of methods for computing document weights and most can be used to compute the (field-weighted) document weight given the parameters $w_i$, $tf_{i,d}$, $dl_d$, and $\theta_d$ based on the virtual document. The search engine 300 then combines the field-weighted term weights for each document into a field-weighted document score 316. Typically, the document scores 316 for evaluated documents are then ranked in descending order to give the user a list of documents that are considered by the search algorithm to be most relevant to the query 302.

The virtual document approach described with regard to FIGS. 2 and 3 represents an effective implementation of a field-weighted search. Another implementation, discussed with regard to FIG. 4, employs document statistics for each document without resorting to generation of a virtual document. The document statistics employed in the implementation illustrated in FIG. 4 includes field-specific information, such as the field location of each term (e.g., which field), field-specific term frequencies, and field lengths.

Figure 4:
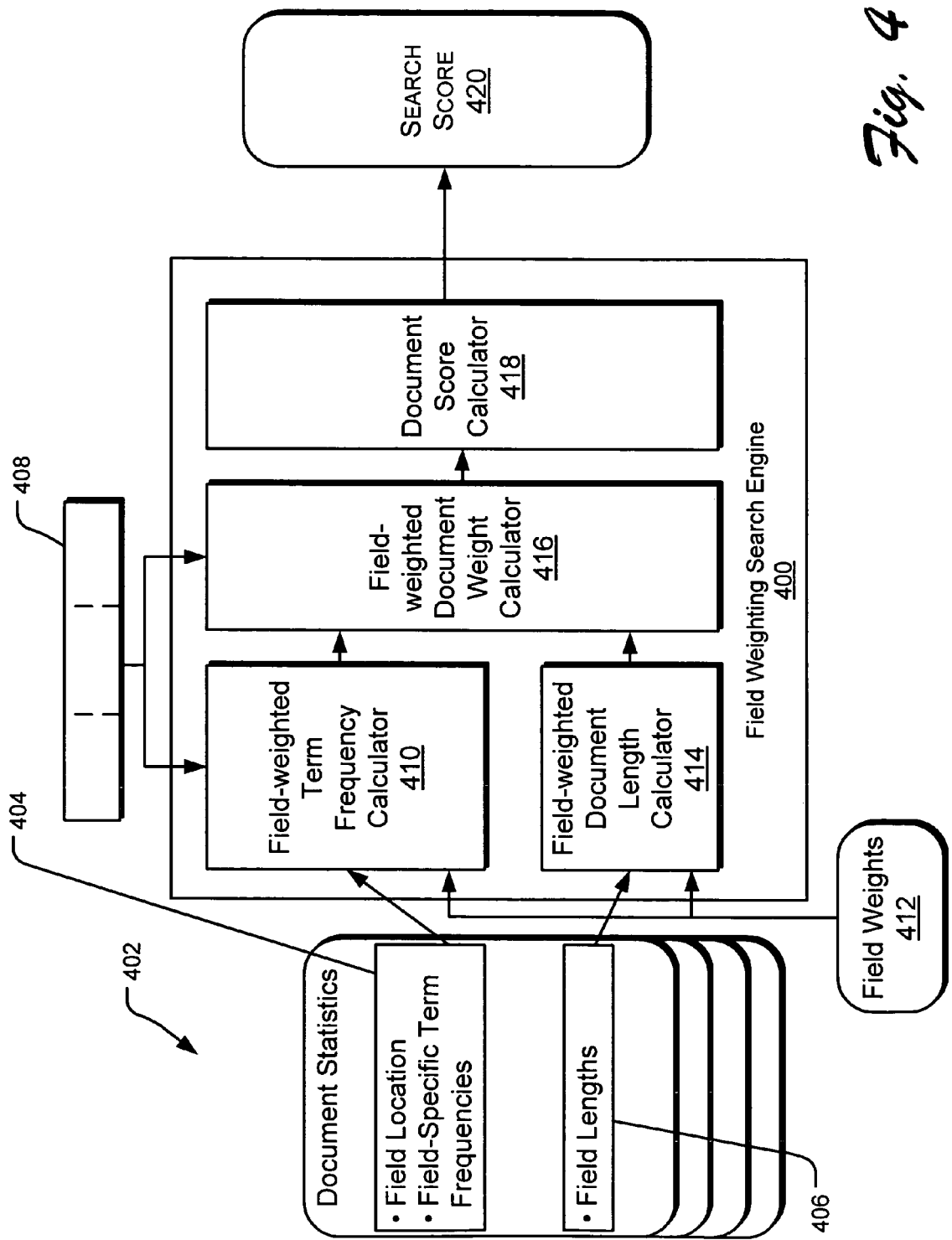
FIG. 4 illustrates an exemplary field weighting search engine employing a field weighting search algorithm to provide a field-weighted search.

FIG. 4 illustrates an exemplary field weighting search engine 400 employing a field weighting search algorithm to provide a field-weighted search. To describe the operations for an exemplary field-weighted search, the following terms and notations are introduced:

Base Query Term Weight ($w_i$)—a weight applied to the query term i

Term Frequency ($tf_{i,d}$)—the number of occurrences of term i in document d

Field-specific Term Frequency ($tf_{i,d,f}$)—the number of occurrences of a term i in field f of document d Document Length ($dl_d$)—the length of document d Field Length ($dl_{d,f}$)—the length of field f in document d Document Weight ($wd_i$)—a function of a base query weight w for each query term i, the Term Frequency ($tf_{i,d}$) in the document d, the document length ($dl_d$) of the document d, and possibly other document-specific information ($\theta_d$) (i.e., $wd_i(w_i, tf_{i,d}, dl_d, \theta_d)$)

Field-weighted Term Frequency ($ntf_{i,d}$)—a combination of field weights and field-specific term frequencies tf for a term i and a document d Field-weighted Document Length ($ndl_d$)—a combination of field-weights and field lengths dl for a document d Field-weighted Document Weight ($fwd_i$)—a function of a base query weight w for each query term, the Field-weighted Term Frequency ($ntf_{i,d}$) in the document d, the Field-weighted document length ($ndl_d$) of the document d, and possibly other document-specific information ($\theta_d$) (i.e., $fwd_i(w_i, ntf_{i,d}, ndl_d, \theta_d)$); this function may be linear or non-linear Field-weighted Document Score ($fsc_d$)—combines the weights of all the field-weighted document weights of all the terms of a query (indexed 1, . . . , V) into a single document score (i.e., $fsc_d(fwd_1, fwd_2, \ldots, fwd_v)$); may be a linear combination or a non-linear combination An index containing exemplary document statistics 402 are input to the field weighting search engine 400. The exemplary document statistics 402 include without limitation a term statistics 404 (including without limitation the frequencies of each term in each field (i.e., "field-specific term frequency") and the locations of each term in each field) and a document length table 406 (which indicates the length of each field). It should be understood that the document statistics 402 may include additional statistics, such as the locations of each term in the document, and the document length table 406 may include additional information, such the length of the overall document.

A multi-term query 408 is input to the field weighting search engine 400. A field-weighted term frequency calculator 410 inputs the query terms from the query 408 and field weights 412 The field-weighted term frequency calculator 410 also retrieves appropriate document statistics 402 (e.g., for each query terms). Based on these inputs, the field-weighted term frequency calculator 410 computes a field-weighted term frequency for each query term for each document. In one implementation, the field-weighted term frequency for a query term i and a document d is computed using the equation $$ntf_{i,d} := \sum_{f \in document\ fields} m_f tf_{i,d,f} \qquad (1)$$

where $m_f$ represents a field weight for field f and $tf_{i,d,f}$ represents a field-specific term frequency for the query term i, a field f, and the document d. However, it should be understood that the algorithm of Equation (1) is merely exemplary and that other algorithms may alternatively be employed.

A field-weighted document length calculator 414 inputs the field weights 412 and appropriate document statistics (e.g., field lengths). Based on these inputs, the field-weighted document length calculator 414 computes a field-weighted document length for each document. In one implementation, the field-weighted document length for a document d is computed using the equation $$ndl_d := \sum_{f \in document\ fields} m_f dl_{d,f} \qquad (2)$$

where $m_f$ represents a field weight for field f and $dl_{d,f}$ represents a field length for a field f and the document d. However, it should be understood that the algorithm of Equation (2) is merely exemplary and that other algorithms may alternatively be employed.

A field-weighted document weight calculator 416 computes a field-weighted document weight $fwd_i$ for each term i in each document d as a function of the base query term weight, the field-weighted term frequency, the field-weighted document length, and possibly other document-specific information (e.g., $nfwd_i(w_i, ntf_{i,d}, ndl_d, \theta_d)$). There exist a variety of methods for computing document weights and most can be used to compute the field-weighted document weight given these parameters. A document score calculator 418 computes a field-weighted document score 420 for each document searched. Typically, the document scores 420 for evaluated documents are then ranked in descending order to give the user a list of documents that are considered by the search algorithm to be most relevant to the query 408.

Figure 5:
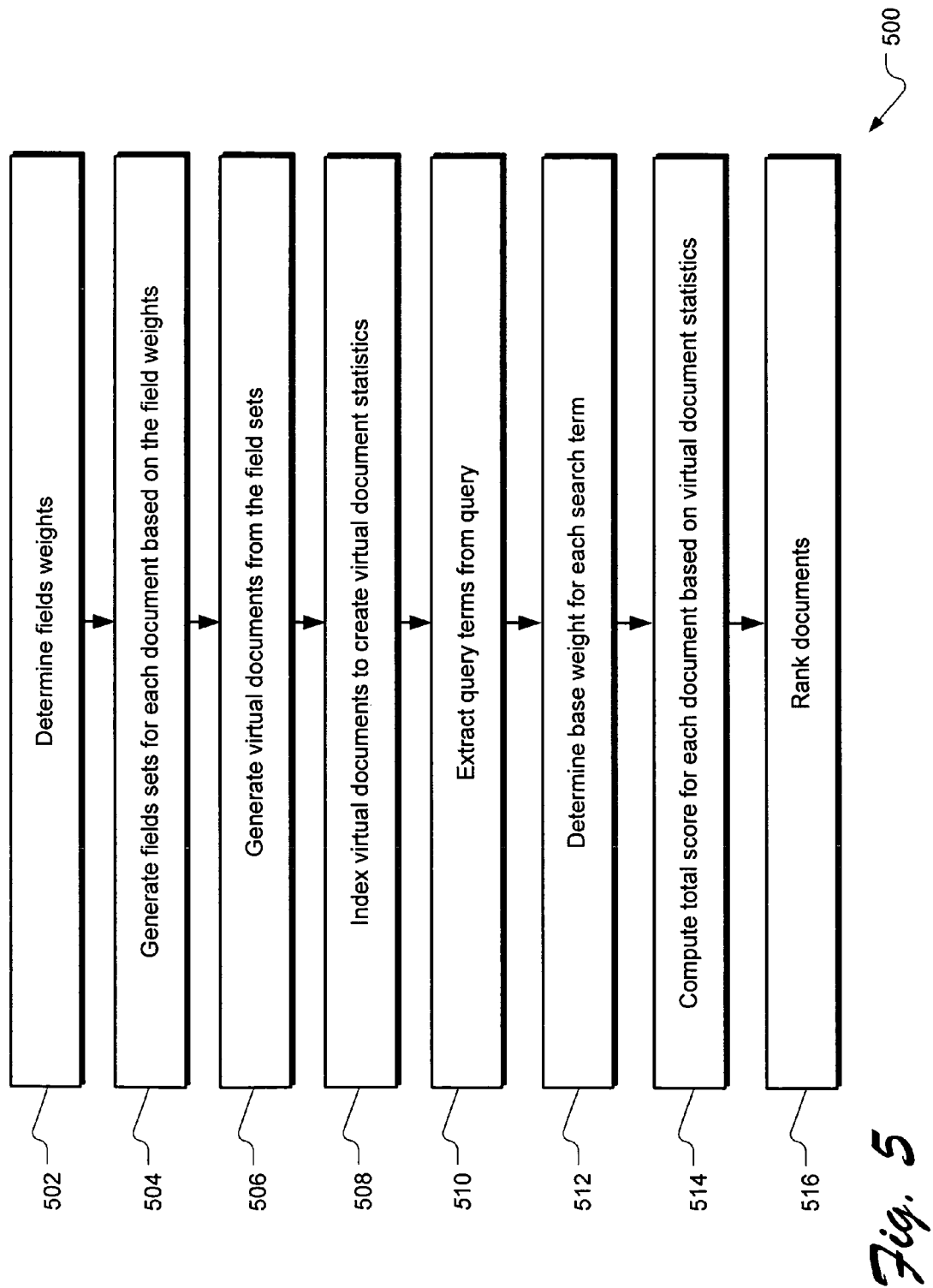
FIG. 5 illustrates operations of an exemplary field-weighted searching process.

FIG. 5 illustrates operations 500 of an exemplary field-weighted searching process using a virtual document approach. A field weight operation 502 determines the weights associated with each field of a set of searchable documents. Some documents may have different fields than other documents, and some fields existing in some documents in the set may not be weighted or may have weights set to zero.

A generating operation 504 generates field sets for each document based on the field weights and the identification of the fields of each document. Another generation operation 506 combine the field sets of each document to product an individual virtual document corresponding to each document. An indexing operation 508 analyzes each virtual document and generates virtual document statistics, which implicitly reflect the field-based influences of the document set.

An extraction operation 510 parses the query to determine the query terms. Base query term weights (e.g., $w_i$) are determined for each query term in a determination operation 512. A computing operation 514 computes for each virtual document the field-weighted document weights for each term from the field-weighted term frequency from the virtual document statistics. The computing operation 514 then computes a field-weighted document score based on the virtual document, which is associated with the original document. In some implementations, the document scores are ranked in ranking operation 516 and displayed in a user interface in the descending order of document score, reflecting each document's anticipated relevance.

Figure 6:
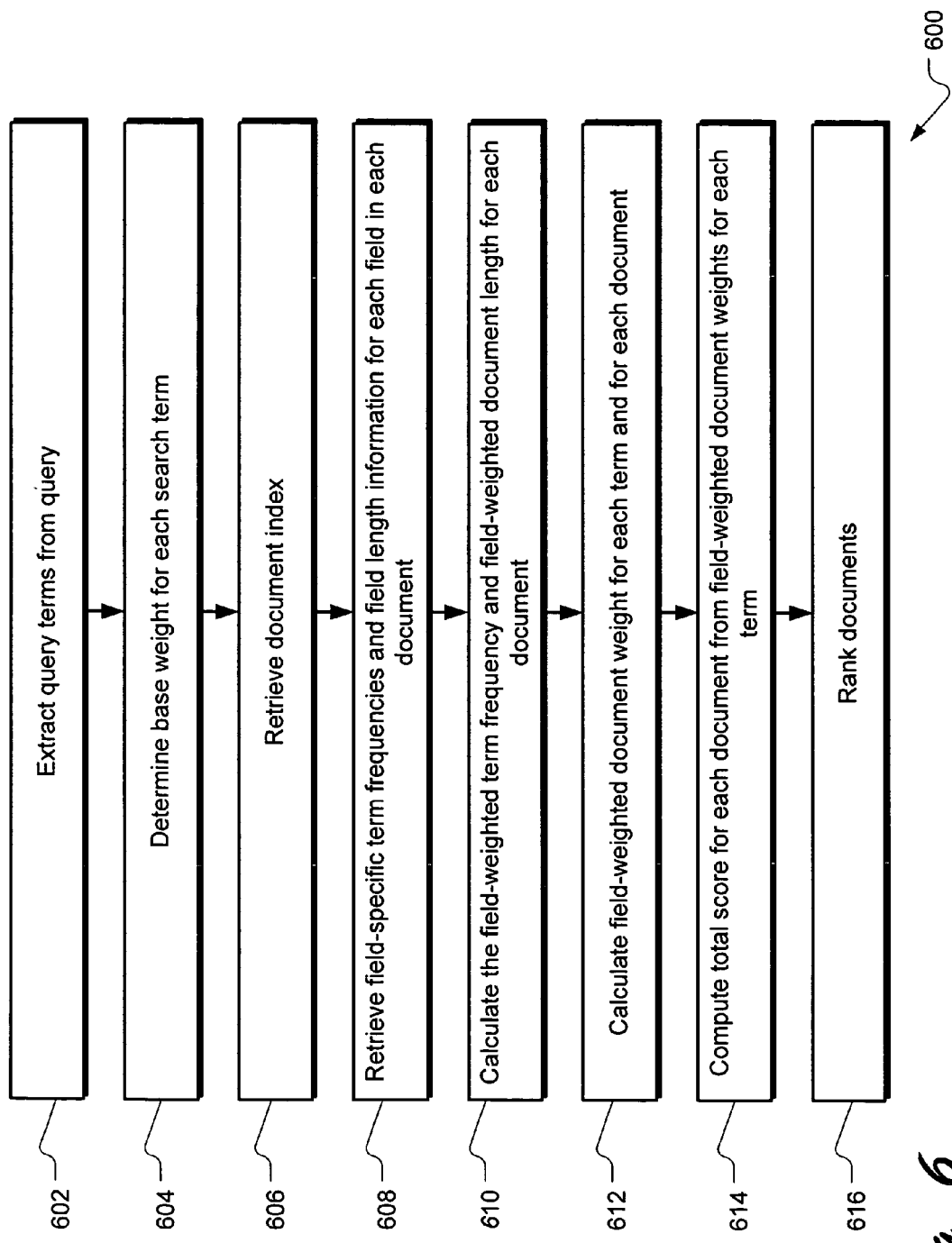
FIG. 6 illustrates operations of another exemplary field-weighted searching process.

FIG. 6 illustrates operations 600 of another exemplary field-weighted searching process. An extraction operation 602 parses the query to determine the query terms. Base query term weights (e.g., $w_i$) are determined for each query term in a determination operation 604.

A document index containing document statistics is retrieved by retrieval operation 606. Another retrieval operation 608 retrieves from the document index field-specific term frequencies and field lengths for each field of each document, based on the field weights. A calculation operation 610 computes the field-weighted term frequency and field-weighted document length for each document based on the field-specific term frequencies and field lengths. Another calculation operation 612 computes a field-weighted document weight for each term based on the field-weighted term frequency and field-weighted document length for each document. A computation operation 614 then computes a field-weighted document score based on the virtual document, which is associated with the original document. In some implementations, the document scores are ranked in ranking operation 616 and displayed in a user interface in the descending order of document score, reflecting each document's anticipated relevance.

Document weights $w_i$ can also be modified by the number of fields in the document in which the term i occurs, represented by the multiple field factor $ff_{i,d}$. In one implementation, a suitable function may take the form:

$$nfwd_i(w_i, ntf_{i,d}, ndl_d, ff_i, \theta_d) := fwd_i(w_i, ntf_{i,d}, ndl_d, \theta_d) \cdot \frac{ff_i}{k_f + ff_i}$$

where $k_f$ represents a scalar constant that controls the extent of the multiple field effect.

Document score $fsc_d$ can also be modified based on detection of multiple query terms in a given field, represented by the multiple term factor $bf_d$. In one implementation, a suitable function may be implemented as follow:

$$bf_d := \frac{\max_{f \in document\ fields}\left\{\sum_{i | tf_{i,d,f} \neq 0} fwd_i\right\}}{\sum_{i=1,\ldots,V} fwd_i}$$

Here $bf_d$ represents a quantity between 0 and 1, which may be used to multiply the document score or may be used in a factor to modify the document score. In one implementation, the document score may be computed as:

$$nfsc_d := [k_m bf_d + (1-k_m)]fsc(nfwd_1, nfwd_2, \ldots, nfwd_v)$$

One specific implementation is based on the BM25 ranking formula (see e.g., Robertson, S. E., Walker, S., Beaulieu, M. M., Gatford, M., Payne, A. (1995): Okapi at TREC-4, in NIST Special Publication 500-236: The Fourth Text Retrieval Conference (TREC-4): 73-96). In such a context, the field-weighted document weights $fwd_i$ may be determined as follows:

$$fwd_i := \frac{(k_1+1)ntf_{i,d}}{k_1\left((1-b)+b\frac{ndl_d}{avndl}\right)+ntf_{i,d}} w_i$$

where $ndl_d$ represents the field-weighted document length, avndl is the average field-weighted document length across the collection of documents, and $k_1$ and b are free parameters. The basic query term weight $w_i$ in the BM25 function is normally calculated as follows:

$$w_i = \log\frac{N - df_i + 0.5}{df_i + 0.5}$$

where $df_i$ is the number of documents in which query term i occurs and N is the total number of documents in the collection. The field-weighted document score $fsc_d$ may then be obtained by adding the field-weighted document weights:

$$fsc_d = \sum_i fwd_i$$

It should be understood that other scoring algorithms, either based on BM25 or otherwise, may also be employed.

Given the BM25 implementation described above, the parameters $k_1$ and b may be optimized once for the non-field-weighted configuration (e.g., all field weights equaling 1 represents an exemplary non-field-weighted configuration) for a given document collection and then be applied to all other combinations of fields weights for that collection. For example, assuming that $k_1^*$ and b* represent the optimal values for the non-field weighted case, $k_1$ and b may be optimized of a field-weighted case by:

(1) Calculating the average term frequency over all terms and all documents in the non-field-weighted configuration, $atf_{unweighted}$.
(2) For a particular combination of field weights, calculating the average term frequency, $atf_{weighted}$ (e.g., an average of the field-weighted term frequencies of all terms and all documents in the field-weighted configuration).
(3) Calculating the optimal b for the field weight combination as b=b*.
(4) Calculating the optimal $k_1$ for the field weight combination as $$k_1 = k_1^* \frac{atf_{weighted}}{atf_{unweighted}}.$$

Figure 7:
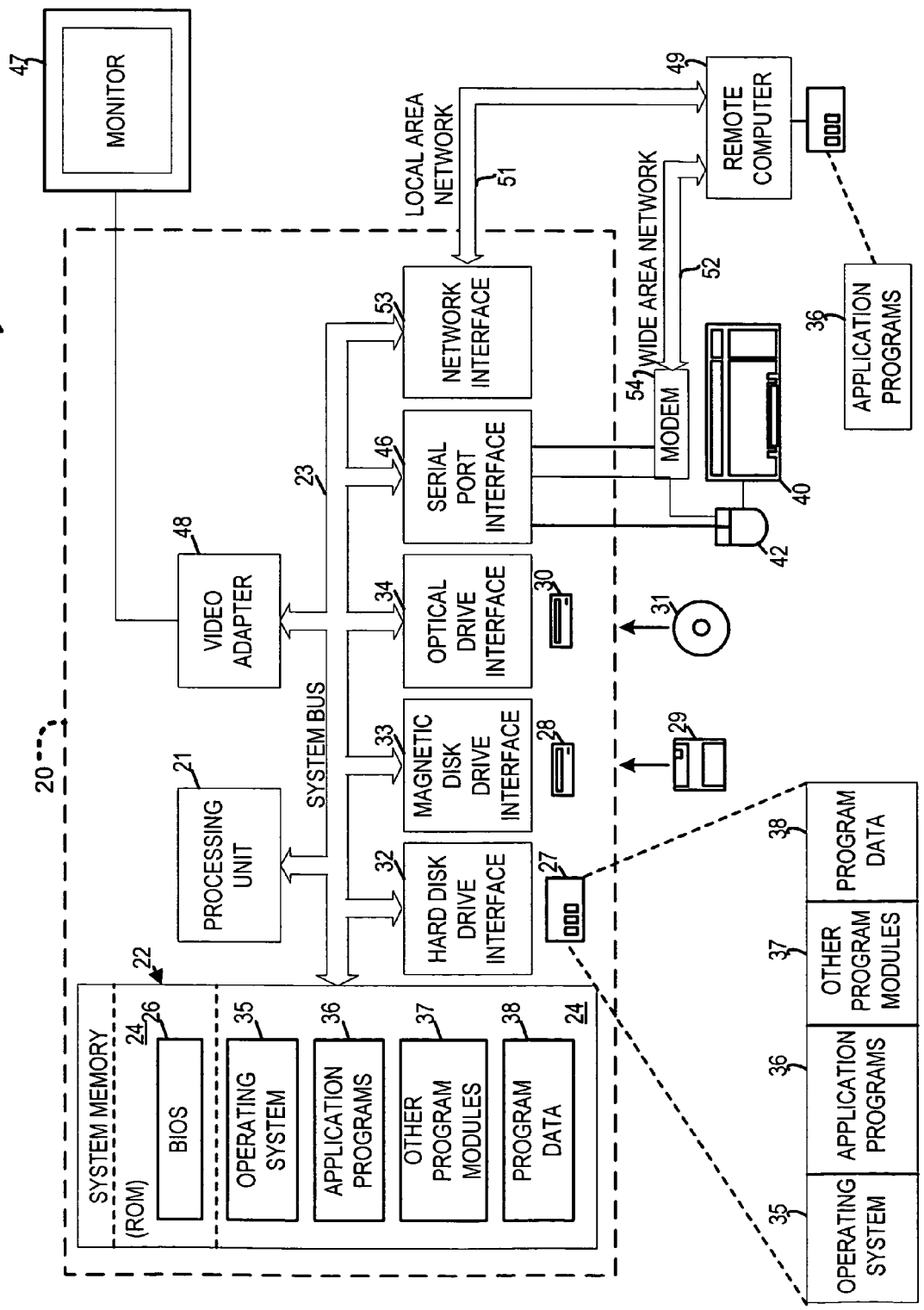
FIG. 7 illustrates a system useful for implementing an embodiment of the present invention.

The exemplary hardware and operating environment of FIG. 7 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite 11 dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a search engine, a virtual document index generator, a field-weighted term frequency calculator, a field-weighted document length calculator, and other modules may be incorporated as part of the operating system 35, application programs 36, or other program modules 37. Document statistics, search scores, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer-implemented method of determining a field-weighted score for a document having multiple fields relative to a query having a plurality of query terms, the computer-implemented method comprising:

determining fields of the document, wherein each field includes a contextual section of the document based on the document structure;

determining a field weight for each of the determined fields, wherein the field weight corresponds to a number of times for replicating the content of each of the determined fields;

replicating the content of each of the determined fields the number of times indicated by the field weight for each of the determined fields, wherein the replicated content of each field is concatenated into a field set for each of the determined fields;

combining each concatenated field set for each field of the document to generate a virtual document including each concatenated field set for each field of the document;

indexing the virtual document to produce virtual document statistics; and causing a processor of a computing device to compute the field-weighted score from the virtual document index based on the query.

2. The computer-implemented method of claim 1 wherein the query is associated with a search and the field-weighted score represents a level of relevance of the document to the query.

3. The computer-implemented method of claim 1 wherein each field weight is represented by an integer value and the replicating operation comprises:

generating each field set to include a number of copies of a field of the document, wherein the number of copies equals the integer value.

4. The computer-implemented method of claim 1 wherein the combining operation comprises:

concatenating each field set into the virtual document.

5. The computer-implemented method of claim 1 wherein the computing operation comprises:

computing a field-weighted document weight for each query term in the query from the virtual document statistics.

6. The computer-implemented method of claim 1 wherein causing the processor of the computing device to compute the field-weighted score from the virtual document index based on the query comprises:
computing a field-weighted document weight for each query term in the query from the virtual document statistics; and
computing the field-weighted score based on the field-weighted document weight for each query term.

7. The computer-implemented method of claim 1 further comprising:
ranking the field-weighted score with field-weighted scores of other documents.

8. A computer-readable storage medium having computer executable instructions for determining a field-weighted score for a document having multiple fields relative to a query having a plurality of query terms, the instructions comprising:
determining fields of the document, wherein each field includes a contextual section of the document based on the document structure;
determining a field weight for each of the determined fields, wherein the field weight corresponds to a number of times for replicating the content of each of the determined fields;
replicating the content of each of the determined fields the number of times indicated by the field weight for each of the determined fields, wherein the replicated content of each field is concatenated into a field set for each of the determined fields;
combining each concatenated field set for each field of the document to generate a virtual document including each concatenated field set for each field of the document;
indexing the virtual document to produce a virtual document statistics; and
computing the field-weighted score from the virtual document index based on the query.

9. The computer-readable storage of claim 8 wherein the query is associated with a search and the field-weighted score represents a level of relevance of the document to the query.

10. The computer-readable storage of claim 8 wherein each field weight is represented by an integer value and the replicating operation comprises:
generating each field set to include a number of copies of a field of the document, wherein the number of copies equals the integer value.

11. The computer-readable storage medium of claim 8 wherein the combining operation comprises:
concatenating each field set into the virtual document.

12. The computer-readable storage medium of claim 8 wherein the computing operation comprises:
computing a field-weighted document weight for each query term in the query from the virtual document statistics.

13. The computer-readable storage medium of claim 8 wherein the computing operation comprises:
computing a field-weighted document weight for each query term in the query from the virtual document statistics; and
computing the field-weighted score based on the field-weighted document weight for each query term.

14. The computer-readable storage medium of claim 8 further comprising:
ranking the field-weighted score with field-weighted scores of other documents.

15. A system comprising:
a processor; and
a memory having computer-executable instructions stored thereon, wherein the computer-executable instructions are configured for:
determining fields of the document, wherein each field includes a contextual section of the document based on the document structure;
determining a field weight for each of the determined fields, wherein the field weight corresponds to a number of times for replicating the content of each of the determined fields;
replicating the content of each of the determined fields the number of times indicated by the field weight for each of the determined fields, wherein the replicated content of each field is concatenated into a field set for each of the determined fields;
combining each concatenated field set for each field of the document to generate a virtual document including each concatenated field set for each field of the document;
indexing the virtual document to produce a virtual document statistics; and
computing the field-weighted score from the virtual document index based on the query.

16. The system of claim 15 wherein the query is associated with a search and the field-weighted score represents a level of relevance of the document to the query.

17. The system of claim 15 wherein each field weight is represented by an integer value and the replicating operation comprises:
generating each field set to include a number of copies of a field of the document, wherein the number of copies equals the integer value.

18. The system of claim 15 wherein the combining operation comprises:
concatenating each field set into the virtual document.

19. The system of claim 15 wherein the computing operation comprises:
computing a field-weighted document weight for each query term in the query from the virtual document statistics.

20. The system of claim 15 wherein the computing operation comprises:
computing a field-weighted document weight for each query term in the query from the virtual document statistics; and
computing the field-weighted score based on the field-weighted document weight for each query term.

21. The system of claim 15 further comprising:
ranking the field-weighted score with field-weighted scores of other documents.

* * * * *